United States Patent [19]
Kaimai et al.

[11] Patent Number: 5,543,068
[45] Date of Patent: Aug. 6, 1996

[54] LUBRICATING OILS FOR FLON COMPRESSORS, COMPOSITIONS ADAPTED FOR FLON COMPRESSORS AND COMPOSED OF MIXTURES OF SAID LUBRICATING OILS AND FLON, AND PROCESS FOR LUBRICATING FLON COMPRESSOR BY USING SAID LUBRICATING OILS

[75] Inventors: Takashi Kaimai; Hiroki Tawaki, both of Saitama; Sumio Yokoo; Yoshie Arakawa, both of Kanagawa, all of Japan

[73] Assignees: Japan Energy Corporation; Nissan Motor Co., Ltd., both of Tokyo, Japan

[21] Appl. No.: 944,342

[22] Filed: Sep. 14, 1992

Related U.S. Application Data

[63] Continuation-in-part of Ser. No. 449,841, Dec. 4, 1989, and a continuation-in-part of Ser. No. 842,975, Feb. 28, 1992, abandoned.

[30] Foreign Application Priority Data

| Apr. 8, 1988 | [JP] | Japan | 63-85346 |
| Apr. 8, 1988 | [JP] | Japan | 63-85347 |
| Apr. 8, 1988 | [JP] | Japan | 63-85348 |
| Sep. 19, 1991 | [JP] | Japan | 3-268208 |

[51] Int. Cl.⁶ .......................... C09K 5/04; C10M 105/08
[52] U.S. Cl. .......................... 252/68; 512/622; 512/625; 508/579
[58] Field of Search .................. 252/52 A, 68; 562/622, 625

[56] References Cited

U.S. PATENT DOCUMENTS

| 2,174,761 | 10/1939 | Schuette et al. | 558/26 |
| 2,674,619 | 4/1954 | Lundsted | 560/198 |
| 2,677,700 | 5/1954 | Jackson et al. | 568/618 |
| 3,036,130 | 5/1962 | Jackson et al. | 544/177 |
| 4,248,726 | 2/1981 | Uchinuma et al. | 252/52 A |
| 4,267,064 | 5/1981 | Sasaki et al. | 252/68 |
| 4,428,854 | 1/1984 | Enjo | 252/69 |
| 4,624,299 | 11/1986 | Harding et al. | 165/1 |
| 4,699,726 | 10/1987 | Nolin | 252/75 |
| 4,755,316 | 7/1988 | Magid et al. | 252/68 |
| 4,851,144 | 7/1989 | McGraw | 252/52 A |
| 4,900,463 | 2/1990 | Thomas et al. | 252/54 |
| 4,916,914 | 4/1990 | Short | 62/84 |
| 4,948,525 | 8/1990 | Sasaki | 252/52 A |
| 4,971,712 | 11/1990 | Gorski | 252/52 A |
| 4,975,212 | 12/1990 | Thomas et al. | 252/54 |
| 5,002,678 | 3/1991 | Vanover et al. | 252/68 |

(List continued on next page.)

FOREIGN PATENT DOCUMENTS

| 0400894 | 5/1990 | European Pat. Off. . |
| 0377122 | 7/1990 | European Pat. Off. . |
| 0386851 | 9/1990 | European Pat. Off. . |
| 0402009 | 12/1990 | European Pat. Off. . |
| 0421765A1 | 4/1991 | European Pat. Off. . |
| 0461262A1 | 12/1991 | European Pat. Off. . |
| 53-140469 | 12/1978 | Japan . |
| 55-58298 | 4/1980 | Japan . |
| 57-51795 | 3/1982 | Japan . |
| 57-63395 | 4/1982 | Japan . |
| 59-113095 | 6/1984 | Japan . |
| 59-117590 | 7/1984 | Japan . |
| 59-179699 | 10/1984 | Japan . |
| 61-281199 | 12/1986 | Japan . |
| 1-259093 | 10/1989 | Japan . |
| 1-259094 | 10/1989 | Japan . |
| 1-259095 | 10/1989 | Japan . |
| 1096358 | 12/1967 | United Kingdom . |
| 84/01165 | 3/1984 | WIPO . |
| WO90/05172 | 5/1990 | WIPO . |

OTHER PUBLICATIONS

Japanese BASF Catalog, "Pluronic® and Tetronic®", 1992; pp. 4–6 and 57–58.
"Encyclopedia of Polymer Science and Engineering" vol. 6, pp. 257–259 (Date Unknown).
"UCON Fluids & Lubricants"—Union Carbide (1987) (month).
J. Oil Chem, vol. 29, No. 9, pp. 636–343 (1980) (month).
Petrotech, vol. 8, No. 6, pp. 562–566 (1985) (month).
DuPont Research Disclosure, No. 17463 (Oct. 1976).
Data Sheet for UCON Lubricant LB–165 (Sep. 25, 1989).
Data Sheet for UCON Lubricant LB–285 (Sep. 25, 1989).
Data Sheet for UCON Lubricant LB–525 (Sep. 25, 1989).
Nippon Oil & Fats Catalogue (No Date).
*Encyclopedia of Polymer Science & Engineering*, vol. 6, pp. 225–322 (1987).

*Primary Examiner*—Prince Willis, Jr.
*Assistant Examiner*—James M. Silbermann
*Attorney, Agent, or Firm*—Oliff & Berridge

[57] ABSTRACT

A lubricating oil for flon compressor includes, as a main ingredient, a compound represented by a formula (I):

$$R_1-[-O-(R_2O)_y-(CH_2CH_2O)_z-H]_x \qquad (I)$$

in which $R_1$ denotes a hydrocarbon residue derived from a $C_{1-8}$ alcohol having a valence of 1 to 4, $R_2$ denotes a $C_{3-4}$ branched alkylene group, x denotes an integer of 1–4, and y and z each independently denote a positive number, $R_2O$ units and $CH_2CH_2O$ units are block copolymerized in an order shown in the formula (I), $z/(y+z)$ is more than 0 but not more than 0.3. The lubricating oil has a kinetic viscosity of 2–30 cSt at 100° C. A mixture of the oil having the formula (I) with a lubricating oil having a formula (II): $R_3-[-O-(R_4O)_m-(CH_2CH_2O)_n-R_5]_l$ may be also used. In the formula (II), $R_3$ denotes a hydrocarbon residue derived from a Cl-s alcohol having one to four hydroxyl groups, $R_4$ denotes a $C_{3-4}$ branched alkylene group, $R_5$ denotes a $C_{1-8}$ alkyl group, l denotes an integer of 1–4, m and n independently denote a positive number, $R_4O$ units and $CH_2CH_2O$ are block copolymerized, and $n/(m+n)$ is more than 0 but not more than 0.5. A lubricating oil/refrigerant composition contains a minor part of such a lubricating oil and a major part of one or more kinds of flons and is highly useful in a process for lubricating a flon compressor.

36 Claims, No Drawings

U.S. PATENT DOCUMENTS

| | | | |
|---|---|---|---|
| 5,021,179 | 6/1991 | Zehler et al. | 252/565 |
| 5,027,606 | 7/1991 | Short | 62/84 |
| 5,032,305 | 7/1991 | Kamakura | 252/67 |
| 5,037,570 | 8/1991 | Gorski et al. | 252/54 |
| 5,120,459 | 6/1992 | Kalota et al. | 252/54 |
| 5,154,846 | 10/1992 | Thomas et al. | 252/68 |
| 5,160,569 | 3/1992 | Nalewajek et al. | 252/54 |

LUBRICATING OILS FOR FLON COMPRESSORS, COMPOSITIONS ADAPTED FOR FLON COMPRESSORS AND COMPOSED OF MIXTURES OF SAID LUBRICATING OILS AND FLON, AND PROCESS FOR LUBRICATING FLON COMPRESSOR BY USING SAID LUBRICATING OILS

This is a continuation-in-part of U.S. patent applications Ser. Nos. 07/449,841 filed Dec. 4, 1989 and 07/842,975 now abandoned filed Feb. 28, 1992, the entire disclosure both of which is hereby incorporated by reference.

BACKGROUND

The present invention relates to lubricating oils for flon compressors, compositions adapted for flon compressors and composed of a mixture of such a lubricating oil and flon, and a process for lubricating flon compressors by using such lubricating oils.

More particularly, the invention is suitably applied to cases where a flon hydrofluorocarbon containing no chlorine, for example, a hydrogen-containing flon refrigerant such as 1,1,1,2-tetrafluoroethane (HFC-134a), 1,1,2,2-tetrafluoroethene (HFC-134), 1,1-difluoroethane (HFC-152a), difluoromethane (HFC-32) or pentafluoroethane (HFC-125) (hereinafter referred to briefly as "HFC 134a, etc."), is compressed. The invention can provide particularly excellent lubricating action in these cases.

Flons having fluorine and chlorine as constituting elements, for example, chlorine-containing flons such as trichloromonofluoromethane (CFC-11), dichlorodifluoromethane (CFC-12), and monochlorodifluoromethane (HCFC-22) have been formerly used for air conditioners or car air conditioners as refrigerants. However, since environmental pollution has come to be recognized as a social problem, hydrogen-containing flon refrigerants such as HFC-134a, etc. have been highlighted as an important new type of refrigerants.

On the other hand, although a number of mineral oil-based or synthetic oil-based compounds have been known as lubricating oils for flon compressors, these compounds cannot be used for HFC-134a, etc., because the former have poor miscibility with the latter. Under the circumstances, a number of polyalkylene polyol-based compounds possessing excellent miscibility with HFC-134a have been recently proposed as lubricating oils.

For example, polyoxypropylene glycol monoalkylether having the average molecular weight of 300–1,200 (Japanese patent application Laid-open No. 1-259,093), polyoxypropylene glycol dialkylether having the average molecular weight of 300–700 (Japanese patent application Laid-open No. 1-259,094), and monoalkyl ether of polyoxyethylene polyoxypropylene copolymer (Japanese patent application Laid-open No. 55-58,298, Japanese patent publication No. 61-52,880 and Japanese patent application Laid-open No. 1-259,095) are known. Further, a number of compounds or compositions, for example, specific polyalkylene glycol monoalkyl ether (Japanese patent application Laid-open No. 2-84,491), polyalkylene glycol derivatives, such as those of dimethyl ethers in which hydroxyl groups at opposite terminals of polyalkylene glycol are methyletherified (Japanese patent application Laid-open No. 2-305,893), refrigerator-lubricating oils containing specific polyether polyols having the average molecular weight of 400 to 5,000 and specific esters (U.S. Pat. No. 4,851,144), and refrigerator compositions composed of random polyoxyalkylene glycol (Japanese patent application Laid-open No. 3-103,496, Japanese patent application Laid-open No. 3-103,497 and U.S. Pat. No. 4,971,712) are proposed.

Although currently known polyalkylene polyol-based refrigerator-lubricating oils exhibit excellent miscibility in use together with HFC-134a, etc., it cannot be said that they also exhibit satisfactory lubricating action in this case. Therefore, improvement of performance of these lubricating oils has been desired.

SUMMARY OF THE INVENTION

It is an object of the present invention to provide lubricating oils capable of exhibiting excellent miscibility over a wide temperature range and more excellent lubricating action even in an atmosphere of a flon containing no chlorine, such as HFC-134a, etc.

It is another object of the present invention to provide compositions including such lubricating oils and flon refrigerants such as those containing no chlorine, such as HFC-134a, etc., and adapted to be used in flon compressors.

It is a further object of the present invention to provide a process for lubricating flon compressors by using such a lubricating oil.

The present inventors examined the structure of polyalkylene polyol-based compounds and their lubricating action in detail, and discovered that compounds having specific structures exhibit both extremely excellent lubrication action and extremely excellent miscibility. The present invention has been accomplished based on this discovery.

The present invention relates to the lubricating oil for flon compressor, containing as a main ingredient, at least one compound represented by a formula (I):

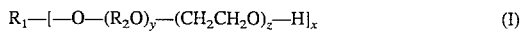

$$R_1-[-O-(R_2O)_y-(CH_2CH_2O)_z-H]_x \qquad (I)$$

in which $R_1$ denotes a hydrocarbon residue derived from a $C_{1-8}$ alcohol having a valence of 1 to 4, $R_2$ denotes a $C_{3-4}$ branched alkylene group, x denotes an integer of 1–4, and y and z each independently denote a positive number, $R_2O$ units and $CH_2CH_2O$ units are block copolymerized in the order shown in formula (I), z/(y+z) is more than 0 but not more than 0.5, and said lubricating oil has a kinetic viscosity of 2–30 cSt at 100° C.

The present invention also relates to the lubricating oil for flon compressors, containing as a main ingredient, a mixture of the compound represented by the above formula (I) and a compound represented by the following formula (II):

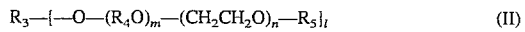

$$R_3-[-O-(R_4O)_m-(CH_2CH_2O)_n-R_5]_l \qquad (II)$$

in which $R_3$ denotes a hydrocarbon residue derived from a $C_{1-8}$ alcohol having one to four hydroxyl groups, $R_4$ denotes a $C_{3-4}$ branched alkylene group, $R_5$ denotes a $C_{1-8}$ alkyl group, l denotes an integer of 1–4, m and n independently denote a positive number, $R_4O$ units and $CH_2CH_2O$ are block copolymerized, and n/(m+n) is more than 0 but not more than 0.5.

The present invention also relates to the composition for a compressor, containing a minor part of the above-mentioned lubricating oil, and a major part of one or more kinds of flon refrigerant, preferably a fluorine-containing flon refrigerant, more preferably a chlorine-free flon refrigerant, and most preferably hydrogen-containing flon refrigerants selected from the group consisting of 1,1,1,2-tetrafluoroethane (HFC-134a), 1,1,2,2-tetrafluoroethane (HFC-134), 1,1-difluoroethane (HFC-152a), difluoromethane (HFC-32) and pentafluoroethane (HFC-125). "Minor part" and "major part" mean "less than 50% by weight" and "more than 50% by weight" respectively The preferred amounts are 1–30% by weight and 99–70% by weight, respectively.

The present invention also relates to a process for lubricating a flon compressor by using the above-mentioned lubricating oil, said flon compressor employing one or more kinds of flon refrigerant, preferably a fluorine-containing flon refrigerant, more preferably a chlorine-free flon refrigerant, and most preferably hydrogen-containing flon refrigerants selected from the group consisting of 1,1,1,2-tetrafluoroethane (HFC-134a), 1,1,2,2-tetrafluoroethane (HFC-134), 1,1-difluoroethane (HFC-152a), difluoromethane (HFC-32), and pentafluoroethane (HFC-125).

These and other objects, features and advantages of the invention will be appreciated upon reading the following description of the invention, with the understanding that some modifications, variations and changes of the invention could be made by the skilled person in the art to which the invention pertains without departing from the spirit of the invention or the scope of the claim appended hereto.

DETAILED DESCRIPTION OF PREFERRED EMBODIMENTS

The polyoxyalkylenemonoalkylether used in the present invention has a chemical structure in which an oxyalkylene group expressed by —$R_2$O— is block polymerized with an oxyethylene group expressed by —$CH_2CH_2$O— (hereinafter referred to briefly as EO) as expressed by the above formula (I).

$R_2$ in the above —$R_2$O— is a branched alkylene group having three or four carbons. Examples of such groups include —CH($CH_3$)$CH_2$—, —$CH_2$CH($CH_3$)—, —CH($C_2H_5$)$CH_2$—, —$CH_2$CH($C_2H_5$)—, —CH($CH_3$)CH($CH_3$)—, and —CH($CH_3$)$CH_2CH_2$—. A part of hydrogen atoms of each of these branched alkylene groups may be substituted by fluorine. As such fluorine-substituted alkylene groups, —$CH_2$CH($CF_3$)— and CH($CF_3$)$CH_2$— may be recited. Such fluorine-substituted alkylene groups are involved in the $C_{3-4}$ branched alkylene group as $R_2$ in the present invention.

The polyoxyalkyleneoxyethylenemonoalkylether used in the present invention is a block copolymer of a $C_{3-4}$ branched alkylene oxide-polymerized portion (hereinafter referred to briefly as $R_2$ unit and expressed by $(R_2O)_y$) and an ethyleneoxide-polymerized portion (hereinafter referred to briefly as EO unit and expressed by $(EO)_z$). It has a structure in which as represented by the formula (I), the entire arrangement is that in which $R_1$, oxygen O, $(R_2O)_y$, $(EO)_z$ and hydrogen H are bonded in this order. If the arrangement of the $R_2$O unit and the EO unit is reversed or the polyoxyalkyleneoxyethylene monoalkylether is a random polymer, lubricity cannot be improved. The above arrangement should be considered as an important feature of the present invention. Lubricity which is conventionally insufficient can be remarkably improved by this arrangement.

It is necessary that the polymerization degrees "y" and "z" of $R_2$O and EO in the polyoxyalkylene oxyethylene monoalkylether according to the present invention, respectively, are 1 or more, and the ratio (mole ratio) of z/(y+z) is not more than 0.5. This mole ratio is preferably not more than 0.4, more preferably not more than 0.3, most preferably not more than 0.25. An appropriate ratio of z/(y+z) may be determined in view of lubricity, hygroscopic resistance, low temperature flowability, and compatibility with flons. The smaller the value of z/(y+z), the more improved is the hygroscopic resistance. Lubricity largely depends upon the presence of EO. When at least one EO unit is contained, excellent lubricity can be obtained. However, if no EO is contained (z=0, that is, z/(y+z)=0), no excellent lubricity can be obtained. Therefore, the lower limit of the ratio: z/(y+z) is attained when one EO unit is contained per one molecule of the polyoxyalkylene monoalkylether (z=1). The lower limit depends upon the molecular weight of the ether. For example, when $R_1$ and $R_2$O in the formula (I) are a methyl group and an oxypropylene group, respectively, the ratios: z/(y+z) are about 0.06, about 0.05, about 0.04, about 0.03 and about 0.02 when the weight average molecular weights are about 1,000, about 1,100, about 1,500, about 2,000 and about 3,000, respectively. In order to obtain more excellent lubricity, it is preferable that the polymerization degree of EO per one molecule of the ether is increased, the ratio: z/(y+z) is preferably not less than 0.05, more preferably not less than 0.1. However, if the ratio is more than 0.5, hygroscopic resistance is deteriorated, and compatibility with the flons drops, and the pour point rises. Therefore, ethers having the ratio of z/(y+z) being greater than 0.5 cannot be used in the present invention. Further, even if one or more EO units are contained per one molecule of the ether and the ratio: z/(y+z) is not more than 0.5 but the ether is a random copolymer or even a block copolymer in which the arrangement of $(R_2O)_y$ and $(EO)z$ is reversed not to satisfy the formula (I) of the present invention, such an ether cannot improve lubricity aimed at by the present invention.

The viscosity of the block-polymerized polyoxyalkyleneoxyethylene monoalkylethers used in the present invention is selected depending upon the kind of refrigerant, the type of refrigerator, use conditions, etc. and considering lubricity, sealability, wear resistance, energy saving, etc. The viscosity of the block-polymerized polyoxyalkyleneoxyethylene monoalkylethers according to the present invention is in a range of 2–30 cSt (100° C.), and preferably in a range of 4–30 cSt (100° C.). If the viscosity is too low, the lubricity is insufficient. The average molecular weight of the block-polymerized polyoxyalkyleneoxyethylene monoalkylether used in the present invention may depend upon the viscosity, and may be selectively set preferably in a range of 300–3,000, more preferably 500–2,500, and most preferably 700–2,500. Particularly when the $C_{1-8}$ alcohol has a valence of 2 to 4, the average molecular weight of the lubricating oil is preferably not more than 1200. The average molecular weight may be adjusted by appropriately controlling the above x, y and z, or by appropriately mixing block-polymerized polyoxyalkyleneoxyethylenemonoalkylethers having different molecular weights.

In the present invention, two or more kinds of the compounds represented by the formula (I) may be used as a mixture. For example, a mixture having its viscosity adjusted to a necessary value may be obtained by mixing a compound having a kinetic viscosity of 2–5 cSt (100° C.) with one having a kinetic viscosity of 10–30 cSt. Further, the lubricating oils according to the present invention may be prepared by mixing, for example, a compound having the viscosity of 2–10 cSt (100° C.) with one having the viscosity of 15–50 cSt (100° C.) such that the viscosity of the lubricating oil composition may be adjusted to an appropriate value such as 5–25 cSt. In addition, a mixture having the ratio of z/(z+y) adjusted to 0.1–0.5 may be obtained through mixing a compound otherwise of the formula (I) but having the ratio of z/(y+z) of 0.6 and a compound of the formula (I) having the ratio of 0.05–0.4. However, in the latter case, it is preferable from the standpoint of the improvement of the lubricity that a mixing ratio of the compound having the ratio of z/(z+y)being more than 0.5 is not more than 50% by weight of the entire mixture R1 in the formula (I) is a saturated hydrocarbon residue of a CI-s aliphatic alcohol having a valence of 1 to 4. Alkyl groups having more than 8 carbon atoms do not give good miscibility with flons. Therefore, appropriate alkyl groups having 8 or less carbon atoms may be selected depending upon use and use conditions. Those having 6–8 carbon atoms give slightly low two-layer separation temperature on a side of high temperatures. Preferably aliphatic groups having 1–4 carbon or more preferably those having 1–2 carbon atoms may be selected. More specifically, as the saturated hydrocarbon residue of the $C_{1-8}$ alkyl groups having monovalence, methyl group, ethyl group, propyl group, butyl group, isopropyl group, pentyl group, hexyl group, heptyl group and octyl group may be recited by way of example. With respect to HFC-134a, etc., methyl group, ethyl group and butyl group are preferred, and methyl group and ethyl group are particularly preferred. Hydrogen or hydrogens of the alkyl group may be replaced by fluorine or fluorines. Examples of fluorinesubstituted hydrocarbons for R1 include trifluoromethyl group and trifluoromethylethyl group. With respect to chlorine-containing flons, saturated hydrocarbon residues of $C_{1-8}$ aliphatic alcohols may be satisfactorily employed without any problem.

With respect to $R_1$ as the hydrocarbon residue of the alcohols having valences of 2 to 4, hydrocarbon residues derived from alcohols selected from the group consisting of ethylene glycol, propylene glycol, diethylene glycol, 1,3-propanediol, 1,2-butanediol, 1,6-hexanediol, 2-ethyl-1,3-hexane diol, a $C_{5-8}$ neopentylglycol type bivalent alcohol, trimethylol ethane, trimethylol propane, trimethylol butane, glycerin, 3-methyl-1,3,5-pentanetriol, and pentaerythritol may be recited by way of example.

Hydroxyl groups of these polyvalent alcohols form block copolymers with $R_2O$ and EO as in the case with the above monovalent alcohols, and are substantially entirely etherified. Therefore, x in the formula (I) takes a value corresponding to the number of hydroxyl groups of the original alcohol. That is, x is 1, 2, 3 or 4 for alcohols having one, two, three or four valences, respectively.

The block-polymerized polyoxyalkylene monoalkylether used in the present invention may be produced by any conventional process known for the production of block copolymers. For example, polyoxypropylenepolyoxyethylene monoalkylether may be obtained by obtaining polyoxypropylene glycol monoalkylether through polymerizing a $C_{1-4}$ monovalent alcohol with propyleneoxide in the presence of a polymerization initiator such as an alkali metal, removing unreacted polypropyleneoxide, and then polymerizing ethyleneoxide with the resulting polyoxypropylene glycol monoalkylether. It is preferable but not always necessary that unreacted raw material is distilled off, and the resulting product is purified, for example, by treating with china clay. The ratio between the $R_2O$ units and the EO units and/or the polymerization degrees thereof can be controlled by adjusting the amounts of the starting materials, and the values for y, z and thus z/(y+z) used herein are thus calculated values calculated from charged amounts of units and EO units used in the reaction to form the block copolymer of the invention. The above process may be similarly applied when another alcohol and/or another $C_{3-4}$ alkylene oxide is used as a starting material.

The block copolymer employed in the present invention may be used in a mixed state with a polyether oil such as polyoxyalkylene glycol, polyoxyalkylene glycol diether or polyoxyalkylene glycol glycerolether, or an ester oil such as polyol ester or complex ester. In this case, the mixing ratio of the block copolymer of formula (I) may be adjusted to be not less than 50% by weight, preferably not less than 60% by weight.

Particularly, the mixed lubricating oil obtained by mixing the compound of the formula (I) with that of the formula (II): $R_3$—[—O—$(R_4O)_m$—$(CH_2CH_2O)_n$—$R_5]_l$ has totally excellent performances with respect to lubricity, hygroscopic resistance and compatibility with flons. When the compound of the formula (II) is mixed with the compound of the formula (I), the lubricity is slighty lowered but compatibility with the flons and hygroscopic resistance are improved, as compared with the lubricating oil containing the compound of the formula (I) alone. Therefore, the above mixed oil is a more excellent lubricant oil for flon compressors, which has totally excellent performances such as lubricity, hydroscopicity and compatibility.

$R_3$, $R_4$, l, m and n in the formula (II) correspond to $R_1$, $R_2$, x, y and z in the formula (I), respectively, and the limitations upon $R_3$, $R_4$, l, m and n are almost the same as those for $R_1$, $R_2$, x, y and z, respectively. $R_5$ is a $C_{1-8}$ alkyl group. If the number of carbons in $R_5$ exceeds 8, compatibility with flons becomes lower. Consequently, such a mixed lubricating oil cannot be practically used. When the lubricity is considered, the number of carbons in $R_5$ is preferably not more than 4. More preferably, $R_5$ is methyl group or ethyl group. The $(R_4O)$ units and $(CH_2CH_2O)$ units constitute the block copolymer, and no limitation may be imposed upon the arranging order of the $(R_4O)$ units and $(CH_2CH_2O)$ units. Particularly when $R_3$ is a residue of an alcohol having two or more valencies, the $((R_4O)$ units and $(CH_2CH_2O)$ units are preferably block copolymerized in the arranging order shown in the formula (II). The mixing ratio between the compound of the formula (I) and that of the formula (II) is preferably 25:75 to 75:25, more preferably 30:70 to 70:30, most preferably 40:60 to 60:40 in terms of weight.

The kinetic viscosity of the mixed lubricating oil composed of the compound of the formula (I) and the compound of the formula (II) for flon compressors is preferably 2–30 cSt at 100° C. more preferably 4–30 cSt at 100° C. asin the case of the lubricating oil for the flon compressor containing the compound of the formula (I) The viscosity of the mixed lubricating oil may be adjusted by appropriately controlling x, y and z in the formula (I) and/or l, m and n in the formula (II) or by appropriately mixing compounds of the above formulae (I) and (II) having different viscosities.

Cresol-based antioxidants such as di-tert-butylcresol, amine-based antioxidants such as phenyl-α-naphthylamine or N,N'-di(2-naphthyl)-p-phenylenediamine, wear inhibitors such as zinc dithiophosphate, phosphate ester, phosphite, chlorinated phosphate ester, molybdenum phosphate or molybdenum carbamate, chlorinated paraffins, sulfur-based extreme pressure additives such as sulfurized oil, another extreme pressure additive such as lead soap, oiliness improvers such as acid, defoaming agents such as silicone-based metal-inactivating agents such as benzotriazole, and/ or additives such as epoxy-based compounds may optionally be compounded with the lubricating oil of the invention in amounts readily determinable by those of ordinary skill in the art, singly or in combination.

The lubricating oil according to the present invention is filled and used in a flon compressor together with flon, preferably, a chlorine-free flon such as HFC-134a, etc., in the form of a mixed liquid. the lubricating oil composition according to the present invention may be also used in the same manner. The liquid composition forms a stably miscible phase at least in a temperature range of −50° C. to +15° C., preferably −50° C. to +30° C., more preferably −60° C. to 50° C. It exhibits excellent performance for lubricating the flon compressor using HFC-134a, etc.

The pour point of the lubricating oil according to the present invention is preferably not more than −20° C., more preferably −20° C. to −80° C.

The lubricating oil according to the present invention for use in the flon compressor has extremely excellent lubricity, exhibits extremely excellent load-withstanding properties and extremely excellent wear resistance when used together with flon containing no chlorine, for example, HFC-134a, HFC-134, HFC-152a, HFC-32 and HFC-125, and stability with such flons, and hygroscopic resistance. This lubricating oil also exhibits excellent effects with respect to conventional flons other than the above HFC-134a, etc.

The lubricating oil and the lubricating oil composition according to the present invention can be used as lubricants for various compressors of reciprocating type, rotary type, centrifugal type, smash plate type, etc. to be used in freezers, refrigerators, automobile, room or industrial air conditioners, etc.

EXAMPLES AND COMPARATIVE EXAMPLES

The present invention will be explained in more detail with reference to examples and comparative examples. These examples are not to be construed as exclusive examples of the present invention.

I. Preparation of lubricating oils (Lubricating oils A1–A15 and B1–B8):

Lubricating oils A1–A15 are examples of the present invention, and lubricating oils B1∝B8 are comparative examples. Lubricating oils A1–A9 and A13–A15 in Table 1 and lubricating oils B1–B7 in Table 2 were each synthesized by polymerizing propylene oxide and ethylene oxide with an alcohol corresponding to $R_1$ in the formula (I), followed by purification, as mentioned below.

A lubricating oil A1 shown in Table 1 was prepared as follows:

116 g methanol and 12 g sodium methylate were charged into a 5-liter autoclave. After the autoclave atmosphere was fully replaced by nitrogen gas, 3,128 g propylene oxide were gradually dropwise added to the mixture in a temperature range of 100°–120° C. under pressure of 1–7 kg/cm²G, and the mixture was subjected to reaction for 14 hours. After the reaction mixture was cured for 2 hours, unreacted propylene oxide was removed by blowing nitrogen gas into the reaction mixture. Then, 695 g ethyleneoxide were added to the reaction mixture in a temperature range of 100°–140° C. under pressure of 1–7 kg/cm²G in 1 hour, and the resulting reaction mixture was cured for 2 hours under the same conditions. Then, unreacted ethylene oxide was removed by blowing nitrogen gas into the reaction mixture. After cooling, the reaction mixture was transferred into a 5-liter egg-plant flask, neutralized with an acid, and dewatered at 120° C. in a vacuum of 20mmHg or less for 2 hours by blowing nitrogen gas thereinto. After cooling, 3,925 g lubricating oil A1 (polyoxypropyleneoxyethylene monomethylether) were obtained by removing a salt with a filter. The ratio of $z/(y+z)$ of A1 was determined as 0.20 by NMR, which was almost equal to $z/(y+z)=0.23$ calculated from charged amounts of propylene oxide and ethylene oxide.

A lubricating oil B4 as a random copolymer was produced as follows:

The B4 random copolymer was obtained in the same manner as in the production of the above-mentioned A1 block copolymer except that 116 g methanol and 12 g sodium methylate were charged into the 5-liter autoclave, and a mixed liquid of 3,200 g propylene oxide and 620 g ethylene oxide was used instead of propylene oxide in the case of A1 after sufficient replacement with nitrogen gas. 3,845 g of lubricating oil B4 (random copolymer) was obtained.

Each of lubricating oils A2–A9, A13–A15, B1–B3 and B5–B7 was produced in the same manner as mentioned above except that the kind and the amount of an alkanol, amount of the oxides, and the order of dropwise adding were varied.

Lubricating oils A10–A12 were lubricating oils each obtained by mixing two kinds of the above-prepared lubricating oils at a ratio given in Table 1. A lubricating oil B8 shown in Table 2 is a commercially available polyoxyalkylene monoalkylether compound manufactured by Sankyo Chemical Co., Ltd. under a tradename of Newpol 50 HB-2000.

II. With respect to the lubricating oils as the examples and comparative examples, their physical properties and performances, average molecular weight, kinetic viscosity, pour point, and miscibility and lubricity with flon refrigerants were measured. Since the ratio of $z/(y+z)$ of A1 determined by NMR was almost equal to the calculated value (rounded off) and the production yield is almost 100%, the ratios of $z/(y+z)$ were calculated from charged amounts of propylene oxide and ethylene oxide used in the reaction. Results are shown in Tables 1 and 2. Testing methods used for these measurement are outlined as follows:

Average molecular weight

The weight average molecular weight was measured by GPC ( gel permeation chromatography).

Kinetic viscosity

Kinetic viscosity was measured according to JIS K 2283.

Pour point

Pour point was measured according to JIS K 2269.

Miscibility with refrigerant

After 0.6 g of each lubricating oil and 2.4 g refrigerant (HFC-134a) were sealingly charged into a glass tube, the mixture was cooled at a cooling rate of 1° C./min. A temperature at which the mixture was separated into two layers in a low temperature range, that is, a two-layer separation temperature on the lower temperature side, was measured. As to a two-layer separation temperature on the upper temperature side, the above mixture was heated at a heating rate of 1° C./min. starting from room temperature, and the temperature at which the mixture was separated into two layers was measured.

Lubricity (1) Falex seizing load was measured according to ASTM D-3233-7 in a HFC-134a or HFC-32 blown atmosphere (70 ml/min.). FC-20 (gray iron casting specified in JIS G5501)and AISI 1137 (free cutting carbon steel, equivalent to JIS G4808 SUM 41) were used as materials to a test pin and a test block, respectively.

(2) A worn amount of the test pin was measured by effecting 1-hour wearing test in HFC-134a blown atmosphere (70 ml/min.) with a Falex tester at 290 rpm under a load of 300 lbf at a given temperature (initial temperature: 40° C.) by using the test pin (FC-20) and the test block (AISI 1137).

(3) Testing was effected under the following conditions by using a car air-conditioner compressor manufactured by Zexcell Co., Ltd. under a tradename of KC-31. After the testing (200 hours of continuous operation), a worn level of a main bearing of the compressor and a content of metals (iron and aluminum) in the lubricating oil were measured.

| | |
|---|---|
| Amount of refrigerant HFC-134a | 1 kg |
| Amount of lubricating oil | 0.12 kg |
| Number of revolutions | 500 rpm |
| Discharge pressure | 19 kg/cm$^2$ |
| Suction pressure | 1.7 kg/cm$^2$ |
| Temperature of discharge gas | 130° C. |

Evaluation results are shown in Tables 1 and 2.

As to A-6, A-7, B-7 and B-9, no compressor test was effected for the following reasons.

A-6 has a very low two-layer separation temperature of 15° C. on the higher temperature side. As to A-7, since it has a very low kinetic viscosity of 3 cSt at 100° C., sealingness can not be kept. B-7 has a very high pour point of −12.5° C. B-8 has a very low two-layer separation temperature of 14° C. on the higher temperature side.

TABLE 1

| Examples | Test oil No. | Lubricating oil $R_1[-O-(R_2O)_y(EO)_zH]_x$ | Type of polymer | Ratio of $z/(y+z)$ | Average molecular weight | Viscosity cSt, 100° C. | Pour point °C. |
|---|---|---|---|---|---|---|---|
| 1 | A1 | C$_1$H$_3$O(PO)$_y$(EO)$_z$H | block | 0.2 | 1100 | 10 | −42.5 |
| 2 | A2 | C$_1$H$_3$O(PO)$_y$(EO)$_z$H | block | 0.4 | 2300 | 24 | −35.0 |
| 3 | A3 | C$_1$H$_3$O(PO)$_y$(EO)$_z$H | block | 0.1 | 1800 | 20 | −37.5 |
| 4 | A4 | C$_3$H$_7$O(PO)$_y$(EO)$_z$H | block | 0.2 | 700 | 6 | <−50 |
| 5 | A5 | C$_4$H$_9$O(PO)$_y$(EO)$_z$H | block | 0.2 | 2000 | 22 | −35.0 |
| 6 | A6 | C$_1$H$_3$O(PO)$_y$(EO)$_z$H | block | 0.2 | 2800 | 30 | −32.5 |
| 7 | A7 | C$_1$H$_3$O(PO)$_y$(EO)$_z$H | block | 0.2 | 300 | 3 | <−50 |
| 8 | A8 | C$_8$H$_{17}$O(PO)$_y$(EO)$_z$H | block | 0.3 | 600 | 5.5 | <−50 |
| 9 | A9 | C$_5$H$_{10}$[O(PO)$_y$(EO)$_z$H]$_x$ *2) | block | 0.3 | 500 | 5 | <−50 |
| 10 | A10 | mixed oil of 30 vol % oil A6 + 70 vol % oil A7 | block | 0.2 | 1100 | 11 | <−50 |
| 11 | A11 | mixed oil of 50 vol % oil A2 + 50 vol % oil A4 | block | 0.3 | 1500 | 13 | −45.0 |
| 12 | A12 | mixed oil of 75 vol % oil A1 + 25 vol % oil B7 | block | 0.3 | 1100 | 10 | −35.0 |
| 13 | A13 | C$_1$H$_3$O(PO)$_y$(EO)$_z$H | block | 0.5 | 1000 | 10 | −20.0 |
| 14 | A14 | C$_1$H$_3$O(PO)$_y$(EO)$_z$H | block | 0.06 | 1000 | 10 | −45.0 |
| 15 | A15 | C$_1$H$_3$O(PO)$_y$(EO)$_z$H | block | 0.03 | 2000 | 22 | −37.5 |

| | | Two-phase separation temperature HFC 134a | | Falex load (Lbf) blown Flon | | Falex worn amount when HFC 134a was blown | Compressor test | | |
|---|---|---|---|---|---|---|---|---|---|
| | | | | | | | Worn amount of bearing | Amount of metals in test oil after testing | |
| Examples | Test oil No. | low temperature | high temperature | HFC 134a | HFC 32 | mg | μm | Fe | Al ppm |
| 1 | A1 | <−60 | 68 | 1430 | 1380 | 4.2 | 10 | <1 | <1 |
| 2 | A2 | <−60 | 48 | 1630 | 1600 | 2.1 | 4 | <1 | <1 |
| 3 | A3 | <−60 | 50 | 1460 | 1460 | 3.8 | 6 | <1 | <1 |
| 4 | A4 | <−60 | >80 | 1360 | 1330 | 4.6 | 12 | <1 | <1 |
| 5 | A5 | <−60 | 40 | 1530 | 1490 | 2.3 | 4 | <1 | <1 |
| 6 | A6 | <−60 | 15 | 1580 | 1550 | 2.9 | — | — | — |
| 7 | A7 | <−60 | >80 | 400 | 380 | 48.5 | — | — | — |
| 8 | A8 | <−60 | 32 | 1390 | 1350 | 4.3 | 12 | <1 | <1 |
| 9 | A9 | <−60 | >80 | 1310 | 1300 | 5.1 | 14 | 8 | 12 |
| 10 | A10 | <−60 | >80 | 1450 | 1400 | 4.0 | 9 | <1 | <1 |
| 11 | A11 | <−60 | 75 | 1500 | 1480 | 3.4 | 5 | <1 | <1 |
| 12 | A12 | <−60 | 68 | 1470 | 1440 | 3.6 | 6 | <1 | <1 |
| 13 | A13 | <−60 | 66 | 1480 | 1460 | 3.9 | 8 | <1 | <1 |
| 14 | A14 | <−60 | 67 | 1380 | 1360 | 4.7 | 12 | <1 | <1 |
| 15 | A15 | <−60 | 42 | 1470 | 1450 | 2.8 | 5 | <1 | <1 |

*1) PO: oxypropylene group  EO: oxyethylene group

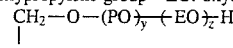

*2) 

TABLE 2 (a)

| | | Test oil No. | Lubricating oil $R_1$—O—$(R_2O)_y(EO)_z$H | Type of polymer | Ratio of $z/(y+z)$ | Average molecular weight | Viscosity cSt 100° C. | Pour point °C. |
|---|---|---|---|---|---|---|---|---|
| Comparative Examples | 1 | B1 | $C_1H_3O(PO)_yH$ | — | 0 | 1000 | 10 | −45.0 |
| | 2 | B2 | $C_1H_3O(PO)_y(EO)_z(PO)_yH$ | block | 0.2 | 1000 | 10 | −42.5 |
| | 3 | B3 | $C_1H_3O(EO)_z(PO)_yH$ | block | 0.2 | 1000 | 10 | −42.5 |
| | 4 | B4 | $C_1H_3O(PO)_y(EO)_zH$ | random | 0.2 | 1100 | 10 | −42.5 |
| | 5 | B5 | $C_1H_3O(PO)_y(EO)_zC_1H_3$ | random | 0.2 | 1000 | 10 | −45.0 |
| | 6 | B6 | $C_1H_3O(PO)_y(EO)_zH$ | random | 0.7 | 1800 | 20 | −10.0 |
| | 7 | B7 | $C_1H_3O(PO)_y(EO)_zH$ | block | 0.6 | 1000 | 10 | −12.5 |
| | 8 | B8 | $C_4H_9O(PO)_y(EO)_zH$*[3] | random | (0.5) | (2300) | (68.8) | (−30.0) |

*[3] Newpol 50HB-2000 manufactured by Sankyo Kasei Co., Ltd.
Parenthesized values are those shown in a Catalogue published by Sankyo Kasei Co., Ltd.

TABLE 2(b)

| | | Test oil No. | Two-phase separation temperature | | Falex load (Lbf) | | Falex worn amount when HFC 134a was blown | Compressor test | | |
|---|---|---|---|---|---|---|---|---|---|---|
| | | | low temperature | high temperature | HFC 134a | HFC 32 | | Worn amount of bearing μm | Amount of metals in test oil after testing Fe | Al ppm |
| Comparative Examples | 1 | B1 | <−60 | 70 | 760 | 770 | 29.0 | 45 | 892 | 271 |
| | 2 | B2 | <−60 | 68 | 880 | 800 | 23.3 | 38 | 621 | 205 |
| | 3 | B3 | <−60 | 66 | 800 | 770 | 26.5 | 41 | 783 | 233 |
| | 4 | B4 | <−60 | 68 | 780 | 740 | 30.2 | 27 | 317 | 98 |
| | 5 | B5 | <−60 | 69 | 690 | 670 | 33.6 | 52 | 1270 | 325 |
| | 6 | B6 | <−15 | 45 | 820 | 800 | 24.8 | 47 | 821 | 209 |
| | 7 | B7 | <−60 | 68 | 1490 | 1470 | 4.0 | — | — | — |
| | 8 | B8 | <−60 | 14 | 910 | 900 | 20.6 | — | — | — |

It is seen that the lubricating oils composed of the block copolymers of polyoxypropyleneoxyethylenemonoalkylethers according to the present invention exhibit excellent miscibility with the refrigerant, and more excellent lubricity as compared with the random copolymers.

For example, the Falex seizing load of the lubricating oils is as high as 1,300–1,600 lbf, and the worn amounts are not more than 5 mg, and no wearing was observed in the compressor test On the other hand, since Comparative Example B1 has no oxyethylene within the polymer, its lubricity is low. B4, B5, B6 and B8 are random polymers, and could not exhibit good lubricity. Although B2 and B3 are block copolymers, they have a structure in which hydroxyl groups are attached to oxypropylene. Therefore, since the methyl group of the oxypropylene group interrupts formation of a strong adsorbing film with the hydroxyl groups, high lubricity cannot be obtained. Since B7 is a block copolymer having the same arrangement as in the present invention, its lubricity is good. However, since the ratio z/(z+y) of B7 is as large as 0.6, its pour point is unfavorably high.

As mentioned above, the specific block copolymers according to the present invention have extremely excellent lubricity and are miscible with fluorine-containing flon. These block copolymers can be said to be lubricating oils capable of overcoming reduction in lubricity due to change in lubricating oils from the chlorine-containing flon to hydrogen-containing flon such as HFC-134a, HFC-32, HFC-125 or the like.

The lubricating oils according to the present invention are lubricating oils which can exhibit excellent miscibility over a wide temperature range, low hydroscopicity and extremely high lubricity even under refrigerant conditions with a hydrogen-containing flon such as HFC-134a, HFC-134, HFC-152a, HFC-32, HFC-125 or the like. Thus, the lubricating oils according to the present invention are suitable as lubricating oils for freezers. Furthermore, the lubricating oils exhibit excellent performance even under conditions with conventional CFC-12, CFC-22, or the like. III. With respect to a mixed lubricating oil obtained by mixing a compound of the formula (I) with a compound of the formula (II), characteristics of lubricating oils were evaluated.

As the compound of the formula (I) and the compound of the formula (II), the polyoxyalkylene monoalkylether (Al) and polyoxyalkylene dialkylether represented by $CH_3$—O—$(R_4O)_m$—$(CH_2CH_2O)_n$—$CH_3$ (hereinafter referred to briefly as Cl) were used, respectively. In In the Cl, $(R_4O)$ is an oxypropylene group, m/n is 8/2, the molecular weight was 1,000, and the viscosity was about 10 cSt (100° C.).

With respect to lubricating oils obtained by mixing Al and/or Cl at respective mixing recipes shown in Table 3, lubricity, compatibility, hygroscopic resistance, and compressor testing were evaluated. Results are shown in Table 3.

TABLE 3

| | | | Mixing ratios (wt %) | | Two-phase separation temperature HFC 134a | | Falex load | Falex worn amount when | Compressor test | | | | |
|---|---|---|---|---|---|---|---|---|---|---|---|---|---|
| | | | | | | | | | Worn | Amount of metals in test oil | | | |
| | Test oil No. | | Al | Cl | low temperature | high temperature | (Lbf) blown Flon HFC 134a | HFC 134a was blown mg | amount of bearing μm | after testing | | Hydroscopicity (wt %) |
| | | | | | | | | | | | Fe | Al ppm | |
| Example | 1 | A1 | 100 | 0 | <−60 | 68 | 1430 | 4.2 | 10 | <1 | <1 | 2.7 |
| | 16 | A16 | 75 | 25 | <−60 | 69 | 1340 | 4.9 | 12 | 3 | 2 | 2.3 |
| | 17 | A17 | 50 | 50 | <−60 | 69 | 1360 | 5.6 | 15 | 10 | 14 | 1.8 |
| Reference | 1 | C1 | 0 | 100 | <−60 | 70 | 810 | 27.8 | 40 | 689 | 217 | 1.1 |

The lubricity, the hygroscopic resistance, and the compressor test were evaluated in the same manners as mentioned above, and the hygroscopicity was evaluated in the following manner.

Hygroscopicity:

Into a beaker of 100 ml was charged 60 g of the test lubricant, which was left to stand at a temperature of 30° C. under humidity of 80% for 7 days and then the content of water in the lubricant was measured.

From Table 3, it is seen that although the lubricating oil composed of the C1 alone had low hygroscopicity but insufficient wear resistance, the mixed oil obtained by mixing A1 with the C1 exhibited excellent wear resistance near that of the A1, and low hygroscopicity. Thus, the mixed lubricating oils had excellent performances as the lubricating oil for refrigerator.

What is claimed:

1. A lubricating oil for flon compressor, containing at least one compound represented by a formula (I):

$$R_1-[-O-(R_2O)_y-(CH_2CH_2O)_z-H]_x \quad (I)$$

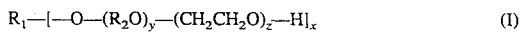

in which $R_1$ denotes a fluorine-substituted hydrocarbon residue derived from a $C_{1-8}$ alcohol having a valence of 1 to 4, $R_2$ denotes a $C_{3-4}$ branched alkylene group, x denotes an integer of 1–4, and y and z each independently denote a positive number, $R_2O$ units and $CH_2CH_2O$ units are block copolymerized in an order shown in the formula (I), and $z/(y+z)$ is not less than 0.02 but not more then 0.5, wherein the average molecular weight of said compound is not less than 500, said lubricating oil having a kinetic viscosity of 2–30 cSt at 100° C.

2. The lubricating oil according to claim 1 wherein $R_1$ is selected from the group consisting of a trifluoromethyl group and a trifluoromethylethyl group.

3. A lubricating oil for flon compressors, containing a mixture of (a) a compound represented by a formula (I):

$$R_1-[-O-(R_2O)_y-(CH_2CH_2O)_z-H]_x \quad (I)$$

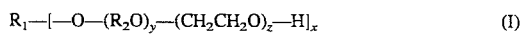

in which $R_1$ denotes a hydrocarbon residue derived from a $C_{1-8}$ alcohol having a valence of 1 to 4, $R_2$ denotes a $C_{3-4}$ branched alkylene group, x denotes an integer of 1–4, and y and z each independently denote a positive number, $R_2O$ units and $CH_2CH_2O$ units are block copolymerized in an order shown in the formula (I), and $z/(y+z)$ is not less than 0.02 but not more than 0.3, wherein the average molecular weight of said compound represented by formula (I) is not less than 500, and (b) a compound represented by a formula (II):

$$R_3-[-O-(R_4O)_m-(CH_2CH_2O)_n-R_5] \quad (II)$$

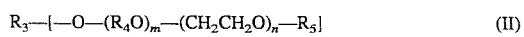

in which $R_3$ denotes a hydrocarbon residue derived from a $C_{1-8}$ alcohol having one to four hydroxyl groups, $R_4$ denotes a $C_{3-4}$ branched alkylene group, $R_5$ denotes a $C_{1-8}$ alkyl group, l denotes an integer of 1–4, m and n independently denote a positive number, $R_4O$ units and $CH_2CH_2O$ are block copolymerized, and $n/(m+n)$ is more than 0 but not more than 0.5.

4. The lubricating oil according to claim 3, wherein a kinetic viscosity of said lubricating oil at 100° C. is 2–30 cSt.

5. The lubricating oil according to claim 3, wherein $R_1$ and $R_3$ independently denote a hydrocarbon residue of a monoalcohol having one hydroxyl group.

6. The lubricating oil according to claim 3, wherein $R_1$ and $R_3$ independently denote a methyl group or an ethyl group.

7. The lubricating oil according to claim 3, wherein a mixing ratio of the compound of the formula (I) and the compound of the formula (II) is 25:75 to 75:25 in terms of weight.

8. The lubricating oil according to claim 3, wherein a mixing ratio of the compound of the formula (I) and the compound of the formula (II) is 40:60 to 60:40 in terms of weight.

9. A lubricating oil/refrigerant composition for a flon compressor, comprising a major part of a flon refrigerant, and a minor part of a flon compressor lubricating oil containing at least one compound represented by a formula (I):

$$R_1-[-O-(R_2O)_y-(CH_2CH_2O)_z-H]_x \quad (I)$$

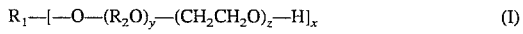

in which $R_1$ denotes a hydrocarbon residue derived from a $E_{1-8}$ alcohol having a valence of 1, $R_2$ denotes a $C_{3-4}$ branched alkylene group, x denotes an integer of 1 and y and z each independently denote a positive number, $R_2O$ units and $CH_2CH_2O$ units are block copolymerized in an order shown in the formula (I), and $z/(y+z)$ is not less than 0.02 but not more than 0.5, wherein the average molecular weight of said compound is not less than 500, said lubricating oil having a kinetic viscosity of 2–30 cSt at 100°C.

10. The lubricating oil/refrigerant composition according to claim 9, wherein said composition comprises 1–30% by weight of the lubricating oil and 99–70% by weight of the flon refrigerant.

11. The lubricating oil/refrigerant composition according to claim 9, wherein the flon refrigerant is a fluorine-containing flon refrigerant.

12. The lubricating oil/refrigerant composition according to claim 9, wherein the flon refrigerant is a chlorine-free flon refrigerant.

13. The lubricating oil/refrigerant composition according to claim 9, wherein the flon refrigerant is at least one hydrogen-containing flon refrigerant selected from the group consisting of 1,1,1,2-tetrafluoroethane, 1,1,2,2-tetrafluoroethane, 1,1-difluoroethane, difluoromethane and pentafluoroethane.

14. The lubricating oil/refrigerant composition according to claim 9, wherein $R_1$ is selected from the group consisting of a methyl group, a propyl group, a butyl group, a pentyl group, A. hexyl group a heptyl group, an octyl group, a trifluoromethyl group and a trifluoromethylethyl group.

15. The lubricating oil/refrigerant composition according to claim 9, wherein $R_1$ is selected from the group consisting of a methyl group and an ethyl group.

16. The lubricating oil/refrigerant composition according to claim 9, wherein $z/(y+z)$ is 0.1–0.4.

17. The lubricating oil/refrigerant composition according to claim 9, wherein said lubricating oil further contains at least one compound represented by a formula (II):

$$R_3-[-O-(R_4O)_m-(CH_2CH_2O)_n-R_5]_l \qquad (II)$$

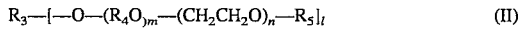

in which $R_3$ denotes a hydrocarbon residue derived from a $C_{1-8}$ alcohol having one to four hydroxyl groups, $R_4$ denotes a $C_{3-4}$ branched alkylene group, $R_5$ denotes a $C_{1-8}$ alkyl group, l denotes an integer of 1–4, m and n independently denote a positive number, $R_4O$ units and $CH_2CH_2O$ are block copolymerized, and $n/(m+n)$ is not less than 0.02 but not more than 0.5.

18. A process for lubricating a flon compressor by using in said flon compressor a lubricating oil containing at least one compound represented by a formula (I), and using in said flon compressor at least one flon refrigerant, wherein formula (I) is:

$$R_1-[-O-(R_2O)_y-(CH_2CH_2O)_z-H]_x \qquad (I)$$

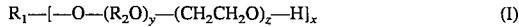

in which $R_1$ denotes a hydrocarbon residue derived from a $C_{1-8}$ alcohol having a valence of 1, $R_2$ denotes a $C_{3-4}$ branched alkylene group, x denotes an integer of 1, and y and z each independently denote a positive number, $R_2O$ units and $CH_2CH_2O$ units are block copolymerized in an order shown in the formula (I), and $z/(y+z)$ is not less than 0.02 but not more than 0.5, wherein the average molecular weight is not less than 500, said lubricating oil having a kinetic viscosity of 2–30 cSt at 100° C.

19. The lubricating process according to claim 18, wherein the flon refrigerant is a fluorine-containing flon refrigerant.

20. The lubricating process according to claim 18, wherein the flon refrigerant is a chlorine-free flon refrigerant.

21. The lubricating process according to claim 18, wherein the flon refrigerant is at least one hydrogen-containing flon refrigerant selected from the group consisting of 1,1,1,2-tetrafluoroethane, 1,1,2,2-tetrafluoroethane, 1,1-difluoroethane, difluoromethane and pentafluoroethane.

22. The process according to claim 18, wherein $R_1$ is selected from the group consisting of a methyl group, an ethyl group, a propyl group, a butyl group, a pentyl group, a hexyl group, a heptyl group, an octyl group, a trifluoromethyl group and a trifluoromethylethyl group.

23. The process according to claim 18, wherein $R_1$ is selected from the group consisting of a methyl group and an ethyl group.

24. The process according to claim 18, wherein $z/(y+z)$ is 0.1–0.4.

25. The lubricating process according to claim 18, wherein said lubricating oil further contains at least one compound represented by a formula (II):

$$R_3-[-O-(R_4O)_m-(CH_2CH_2O)_n-R_5]_l \qquad (II)$$

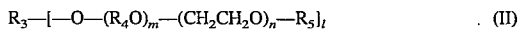

in which $R_3$ denotes a hydrocarbon residue derived from a $C_{1-8}$ alcohol having one to four hydroxyl groups, $R_4$ denotes a $C_{3-4}$ branched alkylene group, $R_5$ denotes a $C_{1-8}$ alkyl group, l denotes an integer of 1–4, m and n independently denote a positive number, $R_4O$ units and $CH_2CH_2O$ are block copolymerized, and $n/(m+n)$ is no less than 0.02 but not more than 0.5.

26. A lubricating oil for flon compressor, containing at least one compound represented by a formula (I)

$$R_1-[-O-(R_2O)_y-(CH_2CH_2O)_z-H]_x \qquad (I)$$

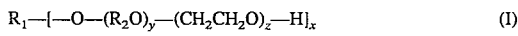

in which $R_1$ denotes a hydrocarbon residue derived from an alcohol selected from the group consisting of trimethylol ethane, trimethylol propane, trimethylol butane, glycerine, 3-methyl-1,3,5-pentanetriol and pentaerythritol, $R_2$ denotes a $C_{3-4}$ branched alkylene group, x denotes an integer of 3 or 4, and y and z each independently denote a positive number, $R_2O$ units and $CH_2CH_2O$ units are block copolymerized in an order shown in the formula (I), and $z/(y+z)$ is not less than 0.02 but not more than 0.3, wherein the average molecular weight of said compound is not less than 500 and not more than 3,000, said lubricating oil having a kinetic viscosity of 2–30 cSt at 100° C.

27. A lubricating oil for flon compressor, containing at least one compound represented by a formula (I):

$$R_1-[-O-(R_2O)_y-(CH_2CH_2O)_z-H]_x \qquad (I)$$

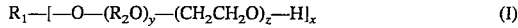

in which $R_1$ denotes a hydrocarbon residue derived from a $C_{1-8}$ alcohol having a valence of 3–4, $R_2$ denotes a $C_{3-4}$ branched alkylene group, x denotes an integer of 3 or 4, and y and z each independently denote a positive number, $R_2O$ units and $CH_2CH_2O$ units are block copolymerized in an order shown in the formula (I), and $z/(y+z)$ is not less than 0.2 but not more than 0.5, wherein the average molecular weight of said compound is not less than 500 and not more than 3,000, said lubricating oil having a kinetic viscosity of 2–30 cSt at 100° C.

28. The lubricating oil according to claim 27, wherein $R_1$ is at least one hydrocarbon residue derived from an alcohol selected from the group consisting of trimethylol ethane, trimethylol propane, trimethylol butane, glycerine, 3-methyl-1,3,5-pentanetriol and pentaerythritol.

29. A lubricating oil/refrigerant composition for a flon compressor, comprising a major part of a flon refrigerant, and a minor part of a flon compressor lubricating oil containing at least one compound represented by a formula (I):

$$R_1-[-O-(R_2O)_y-(CH_2CH_2O)_z-H]_x \qquad (I)$$

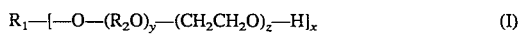

in which $R_1$ denotes a hydrocarbon residue derived from a $C_{1-8}$ alcohol having a valence of 1, 3 or 4, $R_2$ denotes a $C_{3-4}$ branched alkylene group, x denotes an integer of 1, 3 or 4, and y and z each independently denote a positive number, $R_2O$ units and $CH_2CH_2O$ units are block copolymerized in an order shown in the formula (I), and $z/(y+z)$ is not less than 0.02 but not more than 0.5, wherein the average molecular weight of said compound is not less than 500 and not more than 3,000, said lubricating oil having a kinetic viscosity of 2–30 cSt at 100° C.

30. The lubricating oil/refrigerant composition according to claim 29, wherein $R_1$ is selected from the group consisting of a methyl group, an ethyl group, a propyl group, a butyl group, a pentyl group, a hexyl group, a heptyl group, an octyl group, a trifluoromethyl group and a trifluoromethylethyl group.

31. The lubricating oil/refrigerant composition according to claim 29, wherein $R_1$ is at least one hydrocarbon residue derived from an alcohol selected from the group consisting of trimethylol ethane, trimethylol propane, trimethylol butane, glycerine, 3-methyl-1,3,5-pentanetriol and pentaerythritol.

32. The lubricating oil/refrigerant composition according to claim 29, wherein said lubricating oil further contains at least one compound represented by formula (II):

$$R_3\text{—}[\text{—O—}(R_4O)_m\text{—}(CH_2CH_2O)_n\text{—}R_5]_l \qquad (II)$$

in which $R_3$ denotes a hydrocarbon residue derived from a $C_{1-8}$ alcohol having one to four hydroxyl groups, $R_4$ denotes a $C_{3-4}$ branched alkylene group, $R_5$ denotes a $C_{1-8}$ alkyl group, l denotes an integer of 1–4, m and n independently denote a positive number, $R_4O$ units and $CH_2CH_2O$ are block copolymerized, and n/m+n) is not less than 0 but not more than 0.5.

33. A process for lubricating a flon compressor by using in said flon compressor a lubricating oil containing at least one compound represented by a formula (I), and using in said flon compressor at least one flon refrigerant, wherein formula (I) is:

$$R_1\text{—}[\text{—O—}(R_2O)_y\text{—}(CH_2CH_2O)_z\text{—H}]_x \qquad (I)$$

in which $R_1$ denotes a hydrocarbon residue derived from a $C_{1-8}$ alcohol having a valence of 1, 3 or 4, $R_2$ denotes a $C_{3-4}$ branched alkylene group, x denotes an integer of 1, 3 or 4, and y and z each independently denote a positive number, $R_2O$ units and $CH_2CH_2O$ units are block copolymerized in an order shown in the formula (I), and z/(y+z) is not less than 0.02 but not more than 0.5, wherein the average molecular weight is not less than 500 and not more than 3,000, said lubricating oil having a kinetic viscosity of 2–30 cSt at 100° C.

34. The lubricating process according to claim 33, wherein $R_1$ is selected from the group consisting of a methyl group, an ethyl group, a propyl group, a butyl group, a pentyl group, a hexyl group, a heptyl group, an octyl group, a trifluoromethyl group and a trifluoromethylethyl group.

35. The lubricating process composition according to claim 33, wherein $R_1$ is at least one hydrocarbon residue derived from an alcohol selected from the group consisting of trimethylol ethane, trimethylol propane, trimethylol butane, glycerine, 3-methyl-1,3,5-pentanetriol and pentaerythritol.

36. The lubricating process composition according to claim 33, wherein said lubricating oil further contains at least one compound represented by formula (II):

$$R_3\text{—}[\text{—O—}(R_4O)_m\text{—}(CH_2CH_2O)_n\text{—}R_5]_l \qquad (II)$$

in which $R_3$ denotes a hydrocarbon residue derived from a $C_{1-8}$ alcohol having one to four hydroxyl groups, $R_4$ denotes a $C_{3-4}$ branched alkylene group, $R_5$ denotes a $C_{1-8}$ alkyl group, l denotes an integer of 1–4, m and n independently denote a positive number, $R_4O$ units and $CH_2CH_2O$ are block copolymerized, and n/(m+n) is more than 0 but not more than 0.5.

* * * * *